United States Patent [19]

Suzuki

[11] 4,056,937

[45] Nov. 8, 1977

[54] METHOD OF CONSOLIDATING SOILS

[75] Inventor: Manao Suzuki, Tokyo, Japan

[73] Assignee: Kyokado Engineering Co. Ltd., Tokyo, Japan

[21] Appl. No.: 647,596

[22] Filed: Jan. 8, 1976

[51] Int. Cl.$^2$ ............................................. E02D 3/14
[52] U.S. Cl. ...................................... 61/36 B; 106/74
[58] Field of Search ............ 61/36 C, 36 B; 166/292, 166/293; 106/74, 76, 84, 287 SS; 260/DIG. 14

[56] References Cited

U.S. PATENT DOCUMENTS

| | | | |
|---|---|---|---|
| 2,176,266 | 10/1939 | Malmberg | 61/36 B |
| 3,111,006 | 11/1963 | Caron | 61/36 B |
| 3,411,582 | 11/1968 | Dale | 61/36 B |
| 3,435,899 | 4/1969 | McLaughlin et al. | 61/36 C |
| 3,583,166 | 6/1971 | Graf | 61/36 B |
| 3,845,632 | 11/1974 | Slobod et al. | 61/36 B |
| 3,865,600 | 2/1975 | Pearson et al. | 106/84 |
| 3,908,388 | 9/1975 | De Vries | 106/74 |

FOREIGN PATENT DOCUMENTS

| | | | |
|---|---|---|---|
| 675,511 | 5/1966 | Belgium | 61/36 C |

*Primary Examiner*—Paul R. Gilliam
*Assistant Examiner*—Alex Grosz

[57] ABSTRACT

In a method of consolidating soils by injecting a hardner thereinto, a mixture of an aqueous solution of water glass and acidic reactant is employed as the hardener, the aqueous solution being prepared to be within the range of from weak acidity to weak alkalinity in pH value, to prevent the occurrence of pollution such as soil pollution or subterranean water polutions.

14 Claims, No Drawings

METHOD OF CONSOLIDATING SOILS

BACKGROUND OF THE INVENTION

This invention relates to a method of solidifying or consolidating a variety of soils such as, for instance, poor quality soils and water-leaking soils by injecting or impregnating a hardener thereinto, and more particularly to a method of injecting a hardener into such soils in which hardener is a water glass solution whose pH value is adjusted to be within the range of from weak (low) acidity to weak (low) alkalinity (pH being from approximately 5 to 9), to prevent the occurrence of almost all types of pollution such as subterranean water pollution and soil pollution.

In this invention, the term "injection or impregnation process" means that a hardener is injected or impregnated into a poor quality soil or a water-leaking soil (hereinafter referred to merely as "a poor quality soil" when applicable) such as those encountered in building foundation excavation work and subway (or underground railway) excavation work, or into the foundation soil of a dam site or of a bank, or into materials to be formed into soils (such as filling earth or discarded materials) thereby to consolidate those soils so that the soils are changed into strongly hardened soils, or cutoffs (water-tightness) are provided in the soils to stop the leakage of water therein.

Recently, constructional pollution such as underground water pollution and soil pollution have frequently occurred because of the use of high-molecular type hardeners. Accordingly, the use of such hardeners has been prohibited. Therefore, there is a strong demand in the art for the development of hardeners which will not cause such constructional pollution as described above.

An injection process employing a water-glass type hardener (hereinafter referred to as "a water-glass type injection process, when applicable) which, hardener is a mixture of a solution of water glass and reacting agent or reactant, is popular in the art because it is considerably high in security. In this conventional water glass type injection process, the gelling characteristic of the water glass in the alkaline range is utilized since the water glass itself is alkaline. In other words, the conventional water glass type injection process utilizes the principle that if an acidic reacting agent is gradually added to a water glass solution with the amount of the acidic reacting agent to be added at a time being gradually increased, the pH value of the resultant mixture solution is lowered while the gelling time thereof is also shortened. At any rate, the gelling of the water glass is effected in the range of pH 11 to pH 10 (Table I). To this end, if such hardener is introduced into irrigation channels or rivers, undesirable influences will be undoubtedly imparted to human bodies, fish, plants and so forth related thereto.

Table - 1

| Blend (% by weight) | | | | Gelation time |
|---|---|---|---|---|
| No.3 water glass (%) | Reactant (%) | | Water (%) | PH/20° C | min' sec." Temp.20° C |
| 42.5 | Sodium primary phosphate | 1.0 | Remainder | 11.3 | 20$_C$ |
| | Phosphoric acid | 2.3 | | | |
| 42.5 | Sodium primary phosphate | 1.0 | " | 11.2 | 1' |
| | Phosphoric acid | 2.5 | | | |
| 42.5 | Sodium primary phosphate | 1.0 | " | 11.1 | 30" |
| | Phosphoric acid | 2.8 | | | |
| 37.2 | Sodium primary phosphate | 1.9 | " | 11.1 | 1'35" |
| | Phosphoric acid | 1.5 | | | |
| 42.5 | Sodium primary phosphate | 1.0 | " | 11.2 | 31'15" |
| | Phosphoric acid | 1.5 | | | |

This difficulty is caused by the fact that in the conventional water glass type injection process the amount of the reacting agent is adjusted so that the hardener is within the alkaline range, thereby to control the gelling time.

Accordingly, in the present invention the idea or principle that "the gelling time of the hardener is controlled by adding the reacting agent to the water glass solution" is put aside. That is, in this invention, based on the idea or principle that "water glass is added to the solution of reacting agent", gelation with the pH value substantially in the neutral range is employed in the injection process in order to eliminate the occurrence of pollution due to the hardener injecting process. Thus, the invention has been obtained.

More specifically, if water glass is added to the solution of acidic reacting agent and the amount of the water glass is gradually increased, the resultant solution will gradually become neutral and the gelation time is shortened. The gelation time is the shortest in the vicinity of the weak alkalinity. If the amount of the water glass is further increased, the pH of the resultant solution becomes alkaline and the gelation time thereof is increased. The inventor has found that such phenomenon could be applied to a hardener injecting process, and has completed a novel hardener injecting method or process in which a hardener prepared to be within the range of from weak acidity to weak alkalinity is employed.

SUMMARY OF THE INVENTION

Accordingly, a primary object of this invention is to provide a hardener injection process which scarcely causes pollution such as underground water pollution and soil pollution.

Another object of the invention is to provide an injection process in which a solidified soil extremely high duarability is obtained.

A further object of the invention is to provide an injection process by which the water thightness of a soil can be improved.

A still further object of the invention is to provide an injection process in which an ununiform soil containing a course soil layer and a fine soil layer is solidified into a uniform soil.

The foregoing objects and other objects of the invention have been achieved by the provision of a process of injecting a hardener into a soil such as a poor quality soil thereby solidifying the soil or stopping the water leakage therein, in which a mixture of a solution of water glass and acidic reacting agent is employed as the hardener and the mixing ratio thereof is such that the pH value of the mixture solution is within the range of from weak acidity (pH being approximately 5) to weak alkalinity (pH being approximately 9).

The nature, principle, and utility of the invention will become more apparent from the following detailed description and the appended claims.

DETAILED DESCRIPTION OF THE INVENTION

As was described before, in this invention a mixture of a solution of water glass and acidic reacting agent is employed as a hardener to be injected into a soil. However, it may be modified by adding gel control agent thereto, and furthermore the mixture may also be modified by adding clay thereto. In other words, the mixture employed in this invention may be a mixture which is obtained by mixing the water glass, the acidic reacting agent, and the clay, or may be a mixture obtained by adding gel control agent to the mixture thus obtained.

Each of the mixtures thus obtained is so prepared that its pH value is within the range of from weak acidity (pH being approximately 5) to weak alkalinity (pH being approximately 9) with the central pH value being 7. This preparation is achieved by defining the mixing ratio of the components in the mixture solution.

Thus, the hardener employed in this invention is a neutral grout which is prepared so that its pH value is within the range (or the neutral range in pH) of from weak acidity to weak alkalinity with the central pH value being neutrality.

The control or adjustment of the pH value and the gelation time of the hardener is effected as follows:

Control of pH Value

The water glas and the acidic reacting agent are combined together at a certain ratio. This ratio is such that the pH value of the mixture of these components is within the neutral range; however the ratio is dependent on the kinds of acidic reacting agent. Examples of the ratio in the use of phosphoric acid as the acidic reacting agent are shown in Table 2 below:

Table - 2

| Blend (wt. %) | | | | Gelation time |
|---|---|---|---|---|
| No.3 Water glass (%) | Phosphoric acid (%) | Water (%) | PH 20° C | min.' sec." 20° C |
| 5 | 3 | 92 | 2.3 | |
| 10 | 3 | 87 | 6.2 | 29' 45" |
| 15 | 3 | 82 | 8.4 | 1' 17" |
| 20 | 3 | 77 | 10.5 | 15" |
| 25 | 3 | 72 | 11.2 | 42" |
| 30 | 3 | 67 | 11.3 | 50" |
| 40 | 3 | 57 | 11.3 | 1' 43" |
| 50 | 3 | 47 | 11.4 | 17' 50" |
| 5 | 2 | 93 | 4.8 | 435' |
| 10 | 2 | 88 | 7.7 | 3' 40" |
| 15 | 2 | 83 | 11.6 | 10' 07" |
| 20 | 2 | 78 | 11.3 | 78' 10" |
| 25 | 2 | 73 | 11.4 | 220' |

Control of Gelation Time

A. Control by the amount of water:

If the amount of water is adjusted with the ratio of the water glass to the acidic reacting agent being kept constant, only the gelation time can be changed while the pH value is maintained unchanged. In other words, the gelation time is reduced or shortened with the decrease of the amount of water, and the gelation time is increased or lengthened with the increase of the amount of water. (Refer to Table 3 below.)

Table - 3

| Blend (parts by weight) | | | | Gelation time |
|---|---|---|---|---|
| No.3 Water glass (parts) | Phosphoric acid (parts) | Water (parts) | PH (20° C) | min.' sec." (20° C) |
| 10 | 2.5 | 87.5 | 6.4 | 22' 30" |
| 10 | 2.5 | 137.5 | 6.9 | 29' 57" |
| 10 | 2.5 | 287.5 | 7.0 | 89' 30" |

Thus, if the amounts of water, the water glass and the acidic reacting agent are adjusted, a desired gelation time can be obtained while the pH value is maintained within the neutral range.

B. Control by the gel control agent

If, in the water glass type injection process, the conditions relating to the nature of a soil is assumed to be constant, the solidifying strength of the water glass grout depends on the concentration of the water glass. Accordingly, if the concentration of the water glass is fixed to have a desired solidifying strength, the pH value of the hardener is determined by the amount of the acidic reacting agent, and the gelation time is determined by the pH value thus determined. Thus, in the case where the hardener is the combination of water glass and acidic reacting agent, the gelation time can be changed by varying the quantity of the acidic reacting agent and the pH value is also changed, as was described above; that is, it is impossible to adjust the gelation time under the condition that the pH value is being maintained substantially unchanged. (Table 4). Of course, it is possible to change the gelation time by changing the amount of water; however, this method is not desirable because it will vary the concentration of the water glass.

Table - 4

| Blend (wt. %) | | | | Gelation time |
|---|---|---|---|---|
| No.3 Water glass (%) | Phosphoric acid (%) | Water | PH (20° C) | min.' sec." (20° C) |
| 10 | 3 | 87 | 6.2 | 29' 45" |
| 10 | 2.0 | 88 | 7.7 | 3' 40" |
| 10 | Phosphoric acid 2.5 ethylene glycol diacetate 5 | 82.5 | 5.1 | 147' |
| 10 | Phosphoric acid 2.0 glyoxal 3.0 | 85 | 6.5 | 18' 25" |

In this case, the gel control agent is used to adjust the gelation time. That is, in the case when it is required to adjust the gelation time under the conditions that the concentration of the water glass is maintained unchanged and furthermore the ph value is maintained in the neutral range, a gel control agent such as salt and alcohol can be employed.

In the case where the gel control agent is neutral salt or alcohol, even if a proper amount of such gel control agent is added to the mixture of the water glass and the acidic reacting agent, the pH value of the mixture will not be changed, because the neutral salt of alcohol itself is neutral. However, if the gel control agent is an acidic salt or basic salt, the pH will be shifted to alkalinity or acidity. Accordingly, it is necessary to blend three components, namely the components of the water glass, the acidic reacting agent, and the gel control agent in such a manner that the pH value of the mixture solution is within the neutral pH range, that is, the range of from weak acidity to weak alkalinity (Tables 5 and 6).

Table - 5

| | Blend (wt. %) | | | | |
|---|---|---|---|---|---|
| No. Water glass (parts) | Phosphoric acie (parts) | Gel control agent (parts) | Water (parts) | PH (20° C) | Gelation time min.' sec." (20° C) |
| 10 | 2.5 | Sodium primary phosphate 0 | 137.5 | 6.9 | 22'30" |
| " | " | 2 | " | 6.5 | 35'20" |
| " | " | 3 | " | 6.4 | 37'05" |
| " | " | 6 | " | 6.2 | 65'15" |
| " | " | Sodium bicarbonate 2 | " | 7.1 | 19'20" |
| " | " | 4 | " | 7.2 | 11'15" |
| " | " | 8 | " | 7.4 | ×3'20" |

Table - 6

| | Blend (% by weight) | | | | |
|---|---|---|---|---|---|
| No.3 Water glass (%) | Acidic reacting agent (%) | Gel control agent (%) | Water (%) | PH/ 20° C | Gelation time min.' sec." 20° C |
| | Phosphoric acid | Sodium primary phosphate | | | |
| 6.0 | 1.2 | — | Remainder | 6.5 | 50' |
| 6.0 | 0.7 | 2.0 | " | 7.2 | 11' |
| 5.0 | 1.2 | — | " | 6.1 | 25' |
| 5.0 | 0.5 | 1.5 | " | 9.3 | 125' |
| 5.0 | 1.0 | 1.5 | " | 6.2 | 32' |
| 5.0 | 2.0 | 1.5 | " | 5.1 | 60' |
| 5.0 | 1.0 | 2.0 | " | 6.2 | 12" |
| 5.0 | 1.0 | 2.5 | " | 6.1 | 3' |

By the use of such gel control agent, the gelation time can be effectively changed without varying any of the water glass concentration and the pH value. Accordingly, the use of the neutral grout at the field can be considerably facilitated.

Most of the water glasses employed are of a mol ratio ranging from 1.5 to 5.0.

The acidic reacting agents employed in this invention are listed below:

[Acidic reacting agent]

Acids

Inorganic acids such as sulfuric acid, hydrochloric acid, phosphoric acid and pyro-phosphoric acid.

Organic acids such as formic acid, acetic acid, malonic acid, succinic acid, maleic acid, and targaric acid.

Aldehydes

Dialdehydes such as glyoxal, succindialdehyde, malondialdehyde, succinaldehyde, glutaraldehyde, and furfuraldialdehyde.

Esters

Fatty acid esters of monohydric alcohol, such as ethyl acetate, methyl acetate, butyl acetate and amyl acetate.

Fatty acid esters of polyhydric alcohol, such as ethylene glycol diacetate, glycerin triacetate and diester of succinic acid (fully esterified).

Intermolecular esters such as γ-butyrolactone and ε-caprolactam. (cyclic esters: Lactones)

Partially esterified esters of polyhydric alcohol, such as ethyleneglycol mono-formate, ethyleneglycol mono-acetate, ethyleneglycol mono-propionate, glycerin mono-formate, glycerin mono-acetate, glycerin mono-propionate, glycerin di-formate, glycerin di-acetate, sorbitol mono-formate, sorbitol mono-acetate, glucose mono-acetate, and partially saponificated vinylacetate (low grade polymerization).

Unsaturated fatty acid esters such as diacetoxyethylene $CHOCOCH_3 \cdot CHOCOCH_3$ Carbonates such as cyclid carbonate, for example ethylene carbonate, propylene carbonate and glyceryl carbonate.

Amide

Formamide, dimethyl formamide, acetoamide, dimethylacetoamide, propionic amide, butylamide, acrylamide, malonic diamide, pyrolidone, caprolactum, etc..

[Gel control agent]

Inorganic salts

Chlorides or hydrochlorides such as calcium chloride, sodium chloride, potassium chloride, ammonium chloride, zinc chloride, and aluminium chlorides.

Sulfates such as sodium sulfate.

Aluminates such as sodium aluminate and potassium aluminate.

Chlorates such as sodium chlorate, potassium chlorate, sodium perchlorate and potassium perchlorate.

Carbonates such as ammonium carbonate, sodium bicarbonate, potassium bicarbonate and ammonium bicarbonate.

Bisulfates such as sodium bisulfate, potassium bisulfate and ammonium bisulfate.

Bisulfites such as sodium bisulfite, potassium bisulfite and ammonium bisulfite.

Fluosilicates such as sodium silicofluoride and potassium silicofluoride.

Borates such as sodium borate, potassium borate and ammonium borate.

Hydrogen phosphates such as sodium hydrogen phosphate, potassium hydrogen phosphate and ammonium hydrogen phosphate.

Pyrosulfates such as sodium pyrosulfate, potassium pyrosulfate and ammonium pyrosulfate.

Pyrophosphates such as sodium pyrophosphate, potassium pyrophosphate and ammonium pyrophosphate.

Bichromates such as sodium bichromate, potassium bichromate and ammonium bichromate.

Permanganates such as potassium permanganate and sodium permanganate.

Ca, Al, Mg or Fe salts such as lime, gypsum, alumina, iron oxide, magnesium oxide, slag, calcium silicate and clay, each of which produces silicates by reaction with silicic acid.

Organic salts

Sodium acetate, sodium succinate, potassium formate, sodium formate, etc..

Alcohol

Mono- or polyhydric alcohol or polymeric alcohol such as ethyl alcohol, methyl alcohol, amyl alcohol, glycerin, and polyvinyl alcohol.

In the present invention, the above-described hardener is injected or impregnated into a variety of soils such as poor quality soils, to solidify them.

In the invention, the term "injection" means the normal injection of a hardener under pressure (hereinafter referred to merely as "pressure injection" when applicable), a jet injection under high pressure (hereinafter referred to as "high pressure jet injection" when applicable), and furthermore mixing, spraying, and permeating of a hardener inside or outside a soil, said mixing including the mixing of the hardener with materials such as filling earth and discarded or waste materials. It goes without saying that a suitable injection method is selected depending on the conditions of a soil to be injected with the hardener.

Now, this invention will be described in detail with respect to each of the injections aforementioned.

Pressure Injection

This pressur injection is often utilized when the hardener is injected into a poor quality soil which is multilayered, formed by coarse soil layers (containing air gaps therein) and fine soil layers. This method is called a multiple grout process, which includes the following various methods:

1. Method (1) In this method, the following two liquids are employed as the hardener:

Liquid A which is a solution of one or two selected from the group consisting of a gel control agent and clay, and Liquid B which is a mixture of water glass and acidic reacting agent, or a mixture obtained by adding one or two materials selected from the group consisting of gel control agent and clay to the former mixture.

These two liquids are joined together and are injected into the soil. In this process, the liquid B is so blended that the pH value is within the neutral range.

2. Method (2) In this method, the two liquids A and B described in Method (1) above are employed as the hardener, and these two liquids are joined together and are injected into the soil, but during the injection, the feeding of the liquid A is suspended so that only the liquid B is injected thereinto.

3. Method (3) In this method, the following two liquids A and B are employed as the hardener:

Liquid A which is a solution of acidic reacting agent or a solution containing one or two materials selected from the group consisting of gel control agent and clay, in addition to said acidic reacting agent.

Liquid B which is a solution of water glass, or a mixture obtained by adding one or more materials selected from the group consisting of acidic reacting agent, gel control agent and clay, in addition to said water glass.

These two liquids A and B are joined together and are injected into the soil.

In this method, each of the liquids A and B is blended so that the pH value of the liquids obtained by joining them together is maintained within the neutral range.

4. Method (4) In this method, the liquids A and B described in Method (3) above are employed as the hardener, but liquid B is blended so that the pH value thereof is maintained within a range of from weak acidity to weak alkalinity. And a mixture obtained by combining the liquids A and B together is injected into the soil, but during the injection, the feeding of the liquid A is also suspended so that only the liquid B is injected into the soil.

5. Method (5) In this method, the following two liquids A and B are employed as the hardener:

Liquid A which is a water glass solution, or solution which contains one or more materials selected from the group consisting of acidic reacting agent, gel control agent and clay, in addition to said water glass.

Liquid B which is a mixture of water glass and acidic reacting agent, or a mixture obtained by adding one or two materials selected from the group consisting of gel control agent and clay, in addition to the mixture of water glass and acidic reacting agent.

A mixture solution obtained by joining them together is injected into the soil.

In this method, each of the liquids A and B is blended so that the pH value of the mixture solution of A and B is within the neutral range.

6. Method (6) In this method, the liquids A and B described in Method (5) above are employed as the hardener, but liquid B is blended so that the pH value thereof is maintained within a range of from weak acidity to weak alkalinity. And a mixture obtained by combining the liquids A and B together is injected into the soil, but, during the injection, the feeding of liquid A is also suspended so that only the liquid B is injected into the soil.

The combination of the liquids described above is conducted through a Y-shaped pipe for instance.

In the injection methods described above, even if the ratio in feeding of liquid A and B is fluctuated, the liquid obtained by combining liquids A and B (hereinafter referred to as "a liquid AB" when applicable) gels first, and then liquid B permeates the fine soil layer to solidify the latter, and finally both the coarse soil layer and the fine soil layer are thoroughly solidified, as a result of which a strong and uniform soil is obtained. Thus, the injection methods according to this invention, unlike the conventional injection methods, will never cause the ununiform solidification of the soil that the coarse soil layer is solidified but the fine soil layer is not solidified and vice versa. In this case, liquid AB solidifies the coarse soil layer and the liquid B solidifies the fine soil layer. Therefore, this injection method may be called as a multiple grout process.

Since liquid B is capable of solidifying itself, even if liquids A and B are not completely combined together, liquid B solidifies itself without other aids. That is, liquid B never flows out of the injection range of the soil, and furthermore the water glass itself is never introduced into the underground water, as it is. Thus, according to this invention, even though the feeding quantities of the liquids A and B are not controlled at all, the aforementioned effects of the invention can be obtained.

Furthermore, a predetermined amount of liquid AB is injected into the soil, and during the injection the filament feeding of liquid A is suspensed so that only the injection of the liquid B is continued.

In this operation, the gelation time of the combined liquid AB injected first is shorter. Therefore, when liquid AB has permeated large air gaps, an interface between soil layers, or a coarse soil layer (hereinafter being referred to as "a coarse soil layer" when applicable), liquid AB solidifies the coarse soil layer. Then, the feeding of liquid A is suspended and the injection of liquid B only is continued. However, since the coarse soil layer has been impregnated with the combined liquid AB, liquid B (having a high permeability and a long gelation time because it is an aqueous solution) permeates the fine soil layer little by little, and finally fully permeates and solidifies the fine layer.

In this injection method, the coarse soil layer and the fine soil layer are successively soidified by the hardner, as a result of which a strong and uniform soil can be readily obtained.

The combination of the two liquids A and B may be effected by the use of a dual injection pipe or two parallel injection pipes instead of the Y-shaped pipe described before. In this case, the dual injection pipe or the two parallel injection pipes are inserted into the soil, and the combination of the two liquids A and B may be conducted immediately before or immediately after the two liquids A and B are discharged out of the pipes, or at the time when the liquids A and B are discharged out of the pipes.

As is apparent from the above description, one of the specific features of the injection methods resides in that the combination grout of liquids A and B and the grout of liquid B are ingeniously combined, and in addition, in spite of such a simple method it has considerably significant effects. It goes without saying that the injection method may be practiced as follows depending on the conditions of the field. For instance, in the case of a soil out of which water gushes, the injection method may be repeatedly applied thereto while observing the conditions of the water gushing out, or liquids A and B may be joined together after liquids A and B have been separately injected thereinto.

In the case where a soil should be modified into one having a higher strength, Methods (3) and (4) in the multiple grout process described above are applicable. In these methods, liquids A and B are combined together so that the pH value of the resulting liquid is within the neutral range Table 10-(2)). That is, liquid B is made to be a liquid having a high concentration of water glass and added with reacting agent. In addition, the blending is effected so that the pH value is within the alkaline range and the gelation time is sufficiently long. On the other hand, an aqueous solution containing acidic reacting agent is prepared as liquid A. A liquid obtained by combining liquids A and B thus prepared is within the neutral pH range and has a very short gelation time, and therefore can be applied to the coarse soil layer or to the blocking of water streams running inside a soil. After a predetermined amount of the liquid AB, that is, the liquid obtained by combining the liquids A and B has been injected into the soil, the feeding of liquid A is suspended so that only the liquid B is injected thereinto. In this case, since the gelation time of liquid B is long as was described, liquid B will permeate a sufficiently large range of the soil, as a result of which the soil can be solidified into a soil high in strength. It should be noted that since both the coarse soil layer and the path of water stream have been filled with the blended liquid whose pH value is within the neutral range, liquid B will never flow out to undesirable places even if it is high in alkalinity.

In method (6) described above, the blending of liquid B is effected so that its gelation time is long and its pH value is within the neutral range, while an aqueous solution containing only water glass is prepared as liquid A. Liquid AB obtained by combining liquids A and B has specific features that it is low in water glass concentration, low in pH value, and short in gelation time. By utilizing these specific features, first liquid AB, which is short in gelation time and high in strength, is injected into the soil to fill the coarse soil layer in the soil, and then the soil is, as a whole, collectively permeated and solidified with the neutral grout. (Table-11-(2)). High Pressure Jet Injection This injection is also of the multiple grout process. It is applied to poor quality soils according to, for instance, the following methods:

Method (1)

In this method, a liquid A which is a solution of one or two materials selected from the group consisting of a gel control agent and clay, and a liquid B which is a mixture of water glass and acidic reacting agent, or a mixture obtained by adding one or two materials selected from the group consisting of gel control agent and clay to the former mixture, are employed as a hardener. These two liquids A and B are combined together and are injected into the soil. In this operation, at least one of the liquids A and B is injected into the soil in the form of a jetstream under high pressure. In addition, it should be noted that blending of liquid B is effected so that the pH value is within the neutral range.

Method (2)

In this method, a liquid A which is a solution of acidic reacting agent or a solution containing one or two materials selected from the group consisting of gel control agent and clay in addition to acidic reacting agent and a liquid B which is of water glass or a mixture obtained by addiing one or more materials selected from the group consisting of acidic reacting agent, gel control agent and clay in addition to said water glass, are employed as a hardener. Similarly as in Method (1), these two liquids A and B are combined together and are injected into the soil. In this operation, at least one of the liquids A and B is jetted under high pressure into the soil. In the method, the blending of each of the liquids A and B is effected so that the pH value of the liquid obtained by combining the two liquids A and B is within the neutral range.

Method (3)

In this method, a liquid A which is a water glass solution, or a solution which contains or or more materials selected from the group consisting of acidic reacting agent, gel control agent and clay in addition to said water glass, and a liquid B which is a mixture of water glass and acidic reacting agent, or a mixture obtained by adding one or two materials selected from the group consisting of gel control agent and clay to the former mixture solution, are employed as a hardener. These two liquids A and B are combined together and are injected into the soil. In this operation, at least one of the liquids A and B is jetted under high pressure into the soil. In the method, it should be noted that the blending of each of the liquids A and B is effected so that the pH value of liquid obtained by combining liquids A and B is within the neutral range.

In above-described injection methods, liquids A and B may be mixed by a mixer, and the resulting mixture may be jetted under high pressure.

These injection methods will be more concretely described. First of all, a hole is drilled or bored perpendicular to the poor quality soil, and then an injection pipe is inserted into the hole thus bored. This injection pipe is a dual pipe constituted by an outer pipe and an inner pipe inserted into the outer pipe. The outer pipe is open at its end. There are available a variety of outer pipes of different diameter. One such outer pipe has a diameter of 90 mm, for instance. The inner pipe is closed at its end, but the pipe wall at the end portion is provided with jetting nozzle holes. There are also available a variety of inner pipes of different diameter. One such inner pipe has a diameter of 40 mm (less than the diameter of the outer pipe), for instance. The inner pipe should be inserted into the outer pipe so that the portion provided with the jetting nozzle holes is protruded from the end of the outer pipe. The number of the nozzle holes provided on the pipe wall is optional.

Then, liquid B is jetted under a high pressure, for instance at several tens of $Kg/cm^2$ to 1,000 $Kg/cm^2$ or preferably at a pressure of 100 to 500 $Kg/cm^2$, through the inner pipe of the dual pipe into the soil, to cut and loosen the soil. Then, while the cutting and loosening of soil being continued, liquid A is injected into the soil.

Liquids A and B thus injected are combined together in the soil and are solidified. The dual pipe is gradually moved upward while it is being rotated. In this operation, the aforementioned cutting and loosening operation of the soil is still continued. Soon, the portion of the soil thus cut and loosened is solidified to form a solidified soil portion like a column. If the dual pipe is moved upward without rotating it, a film-$h$ shaped solidified body (hereinafter referred to as "a solidified film" when applicable) is formed. (As will be described later, the direction of permeation is fixed by the jetting operation, and therefore such solidified film is formed.)

In this high pressure jet injection method, the water glass injected is positively consolidated, and not only the coarse soil layer but also the fine soil layer are strongly solidified. As a result, the ununiform and poor quality soil is modified into a multi-solidified soil which is uniform and strong. Furthermore, since the soil is cut and loosened by the use of the liquid B, the permeation of the hardener is sufficient. In addition, the cutting and loosening of the soil can be effected in a desired direction, and therefore the direction of permeation can be selected as desired.

In the high pressure jet injection method, as was described above, the hardener (grout) essentially having liquid AB obtained by combining liquids A and B serves to strongly solidify the coarse soil layer (thereby increasing especially the strength of the soil), and on the other hand the hardener (grout) essentially having liquid B serves to consolidate the fine soil layer. As a result, both of the coarse soil layer and the fine soil layer are, as a whole, uniformly consolidated into one unit. Thus, a solidified soil which is uniform and strong, and is excellent in water stoppage or water-tightness can be formed.

In addition, it may be possible in the above-described method to suspend the feeding or injecting of liquid A, and after that, to inject only liquid B under a normal pressure, to widely solidify the soil.

Furthermore, it may be possible that first of all, water is jetted into the soil under a high pressure to cut and loosen the soil, and then, the mixture of liquids A and B is injected into the cut and loosened soil under a normal pressure, and moreover, it may be also possible that, first of all, liquids A and B are mixed by a mixer and then, the mixture is jetted into the soil under a high pressure.

In the method described above, the combination of the two liquids may be achieved by the use of a dual pipe or two parallel injection pipes instead of the aforementioned Y-shaped pipe. The combination of the two liquids may be conducted immediately before, or immediately after, or at the time the two liquids are discharged from the dual pipe or the two parallel injection pipes. In this connection, it goes without saying that if the gelation times of the two liquids are sufficiently long, the two liquids may be mixed by means of one mixer, and the liquids thus mixed may be jetted under high pressure through nozzle holes provided on the end portion of one injection pipe by means of one pump.

Especially in the case when the two liquids A and B are jetted through the end portion of the dual pipe or through that of the two parallel injection pipes, the liquids A and B will be mixed and solidified with particles of the soil while solidifying themselves. That is, a solidified soil having a high strength can be made by a use of the water glass solution having a high concentration.

Mixing

In this method, the hardener is mixed with earth inside or outside the soil to solidify the latter. This mixing may be conducted by a mixer. Furthermore, filling earth or discarded materials may be employed for forming a solidified soil. In this case, the hardener is mixed with the filling earth or the waste materials to solidify the same. The materials thus solidified are put into holes drilled in the soil to form a solidified soil.

Spraying

The hardener is sprayed inside or outside a soil to solidify the soil or to prevent the flying of sand. The spraying of the hardener is conducted by means of a spraying machine. In addition, it is possible that the neutral grout mixed with seeds is sprayed over the face of slope of a road to prevent the face of slope from being decayed by rain and to sufficiently hold the seed therein.

Permeating

The hardeners according to this invention are employed as drilling liquid for boring. That is, if the hardener is filled in bored holes, it will permeate the walls of the holes to solidify the latter. Therefore, the walls thus solidified will prevent water from gushing out or will prevent the damage of the walls of the bored holes. The hardener may be put into a variety of excavated portions of the soil such as those in a shield excavation so that the hardener permeates and solidifies the walls of the excavations. The walls of the excavations thus solidified will prevent water from gushing out or will prevent the damage of the walls of the excavation. Furthermore, in the case where sand guard walls are constructed by inserting precast concrete members into holes bored, the hardener is put into the space between the member and the wall of the hole in order to permit the hardener to permeate and solidify the wall. The walls of the holes thus treated can prevent the gushing or leaking of water from behind the walls.

Furthermore, in the case where sheet piles are driven into a soil, the hardener is put into the space between the pile and the soil to solidify the latter through the permeation of the hardener, thus obtaining effects similar to those in the former case.

Accordingly, the injection process of the present invention, as is clear from the above description, has the following various effects or merits:

1. The hardener is not changed for a long period of time remaining substantially neutral, and accordingly it will never cause pollution such as underground water pollution and soil pollution. This is apparent from the fact that, as indicated in Table 7, even if the hardener is cured in water, the pH value of the curing water is maintained unchanged, that is, it is substantially neutral at all times. (In the conventional method, it will be alkaline, causing pollution.)

Table - 7

| No.3 Water glass (%) | Phosphoric acid (%) | Sodium primary phosphate (%) | Water (%) | PH (20° C) day 1 | 7 | 28 | 90 |
|---|---|---|---|---|---|---|---|
| 42.5 | 2.3 | 1.0 | 54.2 | 8.5 | 10.5 | 10.7 | 10.8 |
| 5 | 1.0 | 1.5 | 92.5 | 6.8 | 6.7 | 6.7 | |

2. The hardener tends to increase with the lapse of time rather than keeps its strength for a long period of time. Accordingly, it can be said that the hardener is high in durability. This is apparent from the fact that, as is indicated in Table 8, even if the hardener is cured in water, the unconfined compression strength is not changed with the lapse of time. (In the conventional method, the strength is lowered.)

3. The viscosity of the hardener is within a range of 1.2 to 2.0 cp (while the viscosity of the conventional hardener which solidifies in the alkaline range is, in general, within a range of 5 to 10 cp), that is, it is very low. Accordingly, the hardener according to this invention can permeate almost all of the soils which allow permeation of water. Therefore, the hardener of this invention can considerably improve the water tightness of a soil.

This invention will be described in more detail by presenting a variety of examples.

EXAMPLE 1

An experimental injection was given to a fine sand soil below the surface of underground water in Tokyo, Japan. The blending (% by weight) of the hardener used was No. 3 water glass 5%, phosphoric acid 1%, sodium primary phosphate 1.5%, and water 92.5%. The water permeability test at the field resulted in K=3.8 × $10^{-4}$ cm/sec before the injection, and K=6.8 × $10^{-7}$ cm/sec after the injection. Furthermore, in a water test made by using an observation well provided five meters away from the field, the pH value test of the water in the well was repeated thirty times. However, no significant variations of the pH value were detected, that is, the pH value was within the range of 7.0 ± 0.2.

If the hardener is mixed with clay such as bentonite, flyash, or clay obtained at the field with as much as 1 to 20% by weight of the hardener, it is more effective for improving the water tightness and for preventing the dilution of the hardener in the coarse soil layer under the underground water. Furthermore, if a hardener obtained by mixing neutral grout and bentonite is employed as drilling liquid for boring it will positively prevent the wall of the hole bored from damage.

Table - 8

| | Blend (% by weight) | | | | | Unconfined compression strength (Kg/cm²) | | | |
|---|---|---|---|---|---|---|---|---|---|
| | No.3 Water glass (%) | Phosphoric acid (%) | Sodium primary phosphate (%) | Water (%) | PH | 1 day | In water (days) 7 | 28 | 90 |
| Known process | 50 | 3 | — | 57 | 11.4 | 3.0 | 1.5 | 0.8 | 0.2 |
| | 42.5 | 2.3 | 1.0 | 54.2 | 11.3 | 3.2 | 1.8 | 1.0 | 0.5 |
| Process of the present invention | 10 | 3 | — | 87 | 6.2 | 1.5 | 1.8 | 2.0 | 2.0 |
| | 10 | 2.5 | 2 | 85.5 | 6.4 | 1.8 | 2.0 | 2.3 | 2.3 |
| | 15 | 3 | 5 | 77 | 6.5 | 2.8 | 3.0 | 3.2 | 3.5 |

A fine sand soil and a coarse sand soil were formed in a water tank in a laboratory and were impregnated with water to form a water-impregnated soil. The waterimpregnated soil thus formed was injected with the following hardeners, different in blending, to perform a comparison test on the underwater solidification factor thereof. The test results are indicated in Table 9.

| Blending (% by weight) | | |
|---|---|---|
| (A) | No. 3 water glass | 6.0 % |
| | Phosphoric acid | 1.2 % |
| | Water | 9.8 % |
| (B) | No. 3 water glass | 6.0 % |
| | Phosphoric acid | 1.2 % |
| | Bentonite | 5% |
| | Water | 87.8 % |
| (C) | No. 3 water glass | 5.0 % |
| | Phosphoric acid | 1.0 % |
| | Sodium primary phosphate | 1.5 % |
| | Water | 92.5 % |
| (D) | No. 3 water glass | 5.0 % |
| | Phosphoric acid | 1.0 % |
| | Sodium primary phosphate | 1.5 % |
| | Bentonite | 5.0 % |
| | Water | 87.5 % |

Table 9

| | Solidification factor in water ($\alpha$) | |
|---|---|---|
| | Soil | Coarse sand |
| Blending | Fine sand | Coarse sand |
| A | 3.0 | 2.0 |
| B | / | 3.3 |
| C | 3.2 | 2.2 |
| D | / | 3.5 |

In this table, $\alpha = \dfrac{\text{solidified sand}}{\text{amount of injection}}$ (by volume)

Where, as is apparent from Table 9, the water glass concentration is low, the solidification factor in the fine sand soil is sufficiently high; however, the solidification factor tends to decrease in the coarse sand soil because the injected liquid is dispensed and diluted. However, it will be seen that the injection liquid added with bentonite is greatly improved in solidification factor.

EXAMPLE 2

By using the four kinds of hardeners listed in Example 1, an injection comparison test was given to a coarse and soil having underground water streams in Tokyo, Japan. The results of water permeation test before and after the injection were compared with one another. The results are indicated in the following Table. As is apparent from this Table, the hardener added with the bentonite is hardly run away from the soil having underground water streams. That is, the soil is tightly impregnated with the hardener, as a result of which the water tightness of the soil is remarkably improved.

| Blending | Water permeability test result K cm/sec | |
|---|---|---|
| | Before injection | After injection |
| (A) | $2.4 \times 10^{-2}$ | $8.4 \times 10^{-5}$ |
| (B) | $3.8 \times 10^{-2}$ | $6.7 \times 10^{-7}$ |
| (C) | $1.3 \times 10^{-2}$ | $5.5 \times 10^{-5}$ |
| (D) | $3.0 \times 10^{-2}$ | $8.0 \times 10^{-7}$ |

In the hardeners described above (below also), phosphoric acid of 75% was employed. In order to improve the dispersibility of the clay, an optional additive such as interfacial activator, dispersing agent, agent for carrying air foam, or blowing agent may be added. Furthermore, in the injection process according to this invention, it is possible to feed the water glass solution and reacting agent solution by respective pumps so that the two solutions are combined together through the Y-shaped pipe and the solutions thus combined are injected into the soil (Table-11-(1) (2)). However, it is desirable that the amounts of the two solutions are precisely weighed, and the two solutions thus weighed are mixed by one mixer, and the resultant solution is injected into the soil.

EXAMPLE 3

An injection test according to this invention was given to a soil comprising fine and coarse sand below the surface of underground water in Tokyo, Japan.

In this test, the blending of the hardener was as indicated in Table-10 (1); however, liquid A was mixed with bentonite of 5% by weight. After 3,000 liters of liquid A and also 3,000 liters of liquid B were injected at a rate of 30 liters per minute, the feeding of liquid A was suspended, and then only liquid B was injected to 3000 liters at a rate of 15 liters per minute. Several water tests were conducted by utilizing an observation well positioned 7 meters remote from the point where the injection was conducted before, during, and after the injection. The results of the water tests show that the pH values obtained were 7 ± 0. The water permeation test resulted in $k=4.8 \times 10^{-3}$ cm/sec before the injection, but it resulted in $k= 7.8 \times 10^{-6}$ after the injection. Thus, the injection could provide a sufficient effect in stopping water.

EXAMPLE 4

An experimental injection test was given to a coarse sand soil below the surface of underground water.

| Liquid A (parts by weight) | | Liquid B (parts by weight) | |
|---|---|---|---|
| Cement | 25 | Water glass | 10 |
| Bentonite | 3 | Ethylene glycol acetate | 5 |
| Water | 73 | Phosphoric acid | 2.5 |
| | | Bentonite | 3 |
| | | Water | 79.5 |

Liquids A and B were fed at the same flow rate (15 l/min) by the respective pumps. The liquids thus fed were combined together by means of a Y-shaped pipe and were injected to the soil through an injection pipe. After 500 liters of liquid A and also 500 liters of liquid B has been injected, the feeding of liquid A was suspended and 3000 liters of liquid B was injected into the soil at a rate of 15 l/min. The gelation time of the liquid obtained by combining the two liquids A and B was within one minute, and the gelation time of liquid B only was 147 minutes. After the injection, the soil thus injected was excavated. As a result, it was found that the liquid obtained by combining the two liquids A and B was solidified around the injection pipe and along the soil interface and that liquid B was uniformly solidified over a wide range of the coarse sand layer.

The water permeation test resulted in $k=8.9 \times 10^{-2}$ cm/sec before the injection, and in $k=4 \times 10^{-6}$ cm/sec after the injection. According to the water test conducted by utilizing an observation well 5 meters remote from the field, the pH values before, during, and after the injection were approximately 6.5.

EXAMPLE 5

A high pressure injection test was given to a poor quality soil formed by a silt clay layer in Tokyo, Japan.

A hole 100 mm in diameter and 10 m in depth was bored in the soil. An outer pipe 90 mm in diameter (a rod pipe having an open end for injecting a liquid A) was inserted into the hole, and an inner pipe 40 mm in diameter (having a closed end and nozzle holes on the wall thereof for injecting a liuqid-B) was coaxially inserted into the outer pipe, thus providing a dual pipe. More specifically, the wall part of the end portion of the inner pipe was provided with two nozzle holes so that the jet stream of liquid B could be jetted perpendicularly to the longitudinal axis of the pipe, and the insertion of the inner pipe was achieved in such a manner that the end portion of the inner pipe was protruded from the outer pipe.

On the other hand, hardeners (or liquids A and B) to be injected into the poor quality soil were prepared as follows:

| Preparation of liquid A (% by weight) | |
|---|---|
| Sodium bicarbonate | 10 % |
| Water | rest |
| Preparation of liquid B (% by weight) | |
| No. 3 water glass (specific gravity 1.4) | 10% |
| Ethylene glycol acetate | 5% |
| Phosphoric acid | 2.5% |
| Water | rest |
| (Gelation is effected in about 147 minutes after blending) | |

When liquids A and B are joined together, the resultant liquid will consolidate in about 10 minutes.

Liquid B thus prepared was injected, under a high pressure of 200 kg/cm², through the inner pipe which was being rotated, while the liquid A was also injected at a pressure of 10 kg/cm² through the outer pipe. In this operation, the soil was cut and loosened by the jet stream of the liquid B, and simultaneously the liquid A was injected into the cut and loosened portion of the soil, as a result of which the two liquids A and B were combined in the cut and loosened portion of the soil.

Then, the cutting and loosening operation of the soil and the joining and injection operation of the two liquids A and B were continued while the dual pipe was gradually moved upward. Soon, the cut and loosened portion of the soil was consolidated to form a column-like consolidated body.

According to the investigation made by drilling the soil thus treated, it was found that a portion of the column-like consolidated body covered by its diameter 30 cm was the consolidated body which was formed essentially with the liquid obtained by combining liquids A and B and the rest was the consolidated body which was essentially formed with water glass, and that, as a whole, both the coarse soil layer and the fine soil layer were modified into one uniformly consolidated body 60 to 80 cm in diameter (multiple grout). This means that the hardener essentially including the liquid obtained by combining liquids A and B permeated the coarse soil layer, while the hardener essentially including the liquid B permeated the fine soil layer. In addition, no leakage of liquid B was observed, and all of the hardeners were consolidated.

EXAMPLE 6

Similarly as in Example 5, an injection test was applied to a poor quality soil formed by a silt clay layer in Tokyo, Japan.

Five holes, each having a 100 mm diameter and a 10m depth, were drilled at interval of 80 cm in the soil. On the other hand, two injection pipes were prepared. One (hereinafter referred to as "a pipe A" when applicable) of the two injection pipes had a 40 mm diameter and an open end, and the other (hereinafter referred to as "a pipe B" when applicable) has a 40 mm diameter and a closed end portion. In addition, the opposite walls of the closed end portion of the pipe B were provided with two nozzle holes. These two pipes were inserted in parallel into each hole bored in the soil in such a manner that the end (nozzle holes) of the pipe B was positioned depper than the end of the pipe A and the nozzle holes of the adjacent pipes B were aligned to face toward to one another.

Liquid B employed was that indicated in Table 5 (4), and liquid A was a mixture of cement 400 kg/m³ and bentonite 50 kg/m³ and bentonite 50 kg/m³.

Liquid B was injected at a high pressure of 200 kg/cm² through all of the pipes B into the soil, and simultaneously liquid A was injected at a pressure of 5 kg/cm² through all of the pipes A into the soil. In this operation, the soil was cut and loosened in the direction obtained by connecting the five holes bored in the soil, and therefore liquids A and B were joined together in the cut and loosened portion of the soil.

The joining and injecting operation of the liquids A and B and the cutting and loosening operation of the soil were further continued while the pipes A and B were gradually moved upward. Soon, the cut and loosened portion of the soil was consolidated to form a consolidated film 30 cm in width and 4 m in length.

According to the investigation made by excavating the soil thus treated, it was found that the solidified film was 30 cm wide, and the central portion, 10 cm in width, of the consolidated film was formed by a consolidated body essentially having liquid A, and the remaining portion thereof was formed by a consolidated body essentially having liquid B or the liquid obtained by combining liquids A and B, and that a consolidated body formed into one unit was obtained as a whole thereby completely stopping the leakage of water.

In addition, no leakage of liquid B was observed. All of liquids A and B were consolidated, and accordingly variation in the pH value of the underground water was scarcely detected.

EXAMPLE 7

Described herein is an example in which the present invention was applied to a tunnel construction. Owing to the application of this invention, in this tunnel construction a sand guard effect and a water stoppage effect could be obtained, thereby safely excavating the tunnel.

The invention was applied to a tunnel test construction in Tokyo, Japan.

Horizontal holes, each being 10 m long, were drilled at intervals of 30 cm along the circumferential surface of a cylinder, 5 meters in diameter, whose central axis was positioned horizontally at 8 meters below the surface of the earth. The same dual pipes as that in Example 5 were inserted into the horizontal holes thus drilled, respectively.

Then, the same liquids A and B as those indicated in Table 11 were prepared. First, liquid B was jetted at a pressure of 200 kg/cm² through the inner pipe of the dual pipe while the inner pipe was being rotated, and simultaneously liquid A was injected so that the two liquids were joined together. Then, the dual pipes were gradually removed from the holes.

According to the investigation performed after the completion of the injection according to the invention, it was observed that a column-shaped consolidated body about 50 cm in diameter essentially including the combination liquid of liquids A and B was formed horizontally around the drilled hole. As a result, in this tunnel construction, the sand guard effect and the water stoppage effect were obtained whereby the soil could be securely excavated and accordingly the tunnel construction was smoothly carried out.

In this connection, it goes without saying that reinforcing materials such as steel bars may be inserted when the holes are drilled.

EXAMPLE 8

In a shield construction field involving coarse and fine sand soils, the soil was solidified for the security and water stoppage of the face. Five lines of injection holes were drilled over 100 meters of the shield to be installed, and a water glass type grout was injected thereinto.

Grouts of the following blendings (A) and (B) were injected into the two injection holes outside, and the following grout of blending (C) was injected into the three injection holes inside.

| | | |
|---|---|---|
| Blending (A) (% by weight) | No. 3 water glass | 10 % |
| | Phosphoric acid | 3.0 % |
| | Bentonite | 5 % |
| | Water | rest |
| Blending (B) (% by weight) | No. 3 water glass | 5.0 % |
| | Phosphoric acid | 1.0 % |
| | Sodium phosphate | 1.5 % |
| | Water | rest |
| Blending (C) (% by weight) | No. 3 water glass | 5.0 % |
| | Phosphoric acid | 1.0 % |
| | Sodium phosphate | 1.5 % |

-continued

| Water | rest |
|---|---|

The pH value of each of the liquids of blendings (A) and (B) was 6.2, and that of the liquid of blending (C) was 10.5.

A water test was conducted by utilizing an observation well 5 meters remote from the area or place of the injection. According to this water test, the pH values before, during, and after the injection were within the range of 6 to 7, that is, the pH value was scarcely varied. In addition, the values of CDD and BOD measured were scarely varied.

Furthermore, according to the solidification investigation made during the shield driving, the soil was firmly solidified with liquid of blending A (C), and the sampling test showed an unconfined compression strength of the order of 10 kg/cm². This means the fact that perfectly water tight layers were formed with the neutral grout on both sides, as a result of which the grout high in strength was positively filled in the inside thereof without leaking away. The fact that the grout put inside the peripheral portion of the shield did not leak out was apparent from a result of the water test. Thus, it can be said that the sealing effect of the neutral grout was clearly verified.

EXAMPLE 9

A water glass reacting agent (acidic reacting agent, gel control agent, or a mixture solution of them) may be injected into the soil before or after the injection of the neutral grout according to this invention. This will remarkably increase not only the solidification characteristic of the neutral grout, but also the strength and water tightness of the solidified body. Such examples will be described below:

The blended liquids as indicated in Table 10 (1) were employed, for solidifying a coarse sand soil in Tokyo. In this case, liquid A was injected into the soil in advance, and then the liquid B was injected thereinto. As a result, the water permeation factor was reduced to one tenth (1/10) of that detected in the case where only liquid B was injected.

The blended liquids as described in Example 6 were emploed in the shield construction field of a clay containing silt soil in Tokyo, Japan. In this case, first only liquid B was injected into the soil, and thereafter liquid A was injected nto the same.

In the case where only liquid B was injected into the soil, the water stopping effect thereof was sufficient, but the stability of the face was insufficient. However, in the case where liquid A was additionally injected, the stability of the face was improved, that is, the sufficient stability thereof was obtained.

This invention has been described in detail above; however, it should be noted that the invention is not limited thereby or thereto. That is, the invention may be modified as follows, obtaining a variety of effects.

Table - 10

| No. | Liquid A (100 wt parts) | | Liquid B (100 wt parts) | | | PH of liquid B liquid B (20° C) | Gelation time of liquid B min.'sec." (20° C) | PH of liquids A+B (20° X) | Gelation time of liquids A+B min.'sec." |
|---|---|---|---|---|---|---|---|---|---|
| | Reactant (wt.parts) | Water (wt.parts) | Water glass (wt.parts) | Reactant (wt.parts) | Water (20° C) | | | | |
| 1 | Sodium bicarbonate 10 | 90 | 10 | ethylene glycol acetate 5 phosphatic acid 2.5 | 82.5 | 5.1 | 147' | 7.4 | 24' 54" |
| 2 | Phosphoric acid 7.4 | 92.6 | 37.4 | ethylene-glycol diacetate 3.9 | 58.7 | 11.4 | 62' 10" | 8.0 | 30" |

Table 11

| No. | (wt parts) | | (wt. parts) | | | PH of liquid B (20° C) | Gelation liquid b min.' sec." (20° C) | liquids A+B (20° C) | Gelation liquids A+B min.' sec." (20° C) |
|---|---|---|---|---|---|---|---|---|---|
| | No. 3 water glass | Water | No. 3 water glass | Reactant | Water | | | | |
| 1 | 15 | 35 | — | phospheric acid 3 | 47 | — | — | 8.4 | 1' 17" |
| 2 | 40 | 10 | — | 10 | 40 | — | — | 7.0 | 10" |
| 3 | 20 | 0 | 10 | 3 | 87 | 6.2 | 29'45" | 11.3 | 1' |

Modification 1

First, the hardener (or the neutral grout) according to this invention is injected into the soil so as to form a wide water tight solidified zone (hereinafter referred to as "a gel" when applicable) in the soil.

Then, a reinforcing injection material is injected under high pressure into the zone (or the gel). More specifically, the injection material is distributed under high pressure in the form of a spider's net in the solidified zone, breaking the gel. That is, in this case, the injection material serves as aggregate. As a result, a solidified zone which has been improved in water tightness and solidification is obtained.

Examples of the reinforcing injection material are listed below:

Urea type grout

This grout consists of an initial condensation product of urea-formaldehyde produt, urea, sulfuric acid, etc..

Acrylic amide type grout

This is comprised of acrylic amide, dimethylamide propionitrile, triethanol amine, ferrous sulfate, citric acid, red prussiate, and pottasium persulfate, or is comprised of acrylic amide, ferrous sulfate, sodium ascorbate, triethanol amine and ammonium persulfate.

Urethane type grout

This is comprised of polyisocyanate, dimethyl laurylamine etc..

Acrylate type grout

This consists of metal acrylte, redox catalyst etc..

Especially the electrolytic material out of the reinforcing injection materials is better for improving the strength of the neutral grout.

The most important thing in this modification is that even if the reinforcing injection material includes various hazardous materials such as alkaline materials, acidic materials, organic materials, and the like, these hazardous materials never flow out, because the hazardous materials are wrapped by the solidified body of the neutral grout and this solidified body is high in water tightness. Accordingly, the underground water in the vicinity of the solidified zone is scarely polluted.

Modification 2

First, a soil zone to be solidified is selected. Then, portions around the zone are solidified by injecting the neutral grout thereinto, thereby to form cut-offs (to make the portions water-tight). Thereafter, a desired hardener (which may be materials causing pollution such as alkaline materials and hazardous materials) is injected into the soil zone surrounded by the cut-offs so that the soil zone is strongly solidified.

Since the portions around the zone have been completely sealed with the high water-tight neutral grout according to this invention, whatever the hardener injected into the zone thus surrounded by the sealed portions or the cut-offs may be, the hardener never flows to the portions around the soil zone selected.

Accordingly, even if a water glass grout employing a hazardous organic reacting agent is injected into the place surrounded by the neutral grout cut-offs, the underground water outside the cut-offs will never be pollluted. Accordingly, the COD or BOD of the underground water is scarcely varied. Furthermore, the hazardous materials unreacted are blocked by the cut-offs, and are decomposed by bacteria in the soil into water and carbonic acid gas, that is, the hazardous materials are changed into nonhazardous materials.

Accordingly, acrylate type grouts or urea type grouts, the use of which is prohibited, can be carefully used for the solidification of a soil zone surrounded by such cut-off or cut-offs.

Modification 3

Underground water is liable to be poluted by high alkaline materials or muddy water during the processes of driving calcium oxide piles into a soil, or of providing continuous walls in a soil, or of driving concrete piles into a soil. In this case, before starting such process, the peripheral portion of the soil selected to be processed is treated with the neutral grout according to this invention so as to form a water tight cutoff. This will lead to the fact that the underground water is not polluted by the alkaline materials. In addition, it should be noted that the alkaline materials facilitate to accelerate the solidification of the neutral grout of the invention.

Modification 4

There is a case in which waste materials (such as those from factories or households) should be buried in a soil. In this case, before doing so, the soil is treated with the neutral grout according to this invention. In this way, the organic materials in the waste materials can be completely sealed, and in addition the water-soluble components in the waste materials facilitate to accelerate the solidification of the neutral grout of the invention and to improve the strength and water tightness.

Modification 5

By applying the neutral grout of this invention to a soil in which waste water flows, a water-tight water channel can be provided. This water channel thus created prevents the hazardous material in the waste water from flowing out of the water channel; that is, the pollution of underground water in the vicinity thereof can be prevented. Furthermore, it should be noted that this hazardous material serves to improve the strength and water tightness of the neutral grout solidified, and it will prevent the leakage of the hazardous material.

Modification 6

In the case where a hazardous material such as hexavalent chromium is abandoned in a soil, or a soil is polluted with hazardous materials, the peripheral portion of the soil is solidified by injecting the neutral grout of this invention thereinto in such a manner that the hazardous materials are surrounded by the water-tight solidified body of the neutral grout. This wll lead to the fact that the underground water is not polluted by the hazardous materials. In this case, it is an idea to seal the hazardous materials themselves by applying the neutral grout directly thereto. In this case also, the hazardous materials serve to improve the strength and water tightness of the solidified body of the neutral grout.

Modification 7

Waste materials or hazardous materials are solidified by the use of the neutral grout according to this invention, and the materials thus solidified are abandoned into the sea, or into holes drilled in a soil. If the abandonment of such materials is conducted in this way, the materials will never be caused to flow into the underground water.

Modification 8

Shielding walls are provided on both sides of a waste water channel so as to prevent the pollution of the underground water in the vicinity thereof.

Modification 9

Based on the various advantages such as the excellent permeability of the neutral grout of the invention, the outstanding water-tightness and durability of the solidified body of the neutral grout, and the significant characteristic of holding the materials in the solidified body, the present invention may be further modified as follows:

A. The neutral grout according to this invention is mixed with a material which serves to change the hazardous material into a non-hazardous material. The hazardous material is solidified by injecting the neutral grout thus treated thereinto.

For instance, if the neutral grout mixed with ferric sulfate is injected into the place where hexavalent chromium slag has been abandoned, the neutral grout will seal the hexavalent chromium so that the pollution of the underground water due to the hexavalent chromium is prevented, and simultaneously the ferric sulfate serves to reduce the hexavalent chromium into trivalent chromium which is non-hazardous.

Based on the same idea, it is possible to treat malordorous materials by applying the neutral grout mixed with deordorizing agent thereto. Furthermore, if the neutral grout mixed with potassium permanganate is injected to organic materials, the organic materials can be decomposed.

B. By treating a soil with the neutral grout mixed with valuable material, this valuable material can be held in the soil for a long period of time.

For instance, if the neutral grout mixed with a fertilizer is injected into the root of a predetermined plant, the fertilizer component will be held therein for a long period of time.

Furthermore, if the neutral grout mixed with a fertilizer is sprayed over the face of slope of a road together with seeds, the grout permeates thereinto and will prevent the face of slope from being decayed by rain and sufficiently hold the fertilizer there to facilitate the growing of the seeds.

Similarly as in the above described cases, preventive agent, agricultural chemicals, or disinfectants may be mixed with the neutral grout according to this invention.

What is claimed is:

1. In a method of solidifying a soil or making soil water-tight by injecting a hardener thereinto, in which a mixture of water glass and acidic reacting agent is employed as said hardener, and said solution is blended so that the pH value thereof is within a range of from weak acidity of about fine to weak alkalinity of about 9, thereby to reduce the pollution of soil or subterranean water, characterized in that a liquid A which is a solution of one or two materials selected from the group consisting of a gel control agent and clay, and a liquid B which is a mixture of water glass and acidic reacting agent are employed as said hardener, and said liquids A and B are joined together and are injected into said soil, said liquid B being blended so that the pH thereof being maintained within a range of from acidity to weak alkalinity.

2. A method as claimed in claim 1, in which said liquid B contains one or two materials selected from the group consisting of gel control agent and clay, in addition to said water glass and said acidic reacting agent.

3. A method as claimed in claim 1, in which during the injection of said liquids A and B, the feeding of said liquid A is suspended so that only said liquid B is injected into said soil.

4. A method as claimed in claim 1, in which at least one of said liquids A and B is injected under high pressure in the form of a jet stream.

5. In a method of solidifying a soil or making soil watertight by injecting a hardener thereinto, in which a mixture of water glass and acidic reacting agent is employed as said hardener, and said solution is blended so that the pH value thereof is within a range of from weak acidity to weak alkalinity thereby to reduce the pollution of soil of subterranean water, characterized in that a liquid A which is a solution of acidic reacting agent, and a liquid B which is a solution of water glass are employed as said hardener, and said liquids A and B are joined together and are injected into said soil, each of said liquids A and B being blended so that the pH value of the liquid obtained by combining said liquids A and B is maintained within a range of from weak acidity of about five to weak alkalinity of about 9.

6. A method as claimed in claim 5, in which said liquid A contains one or two materials selected from the group consisting of gel control agent and clay, in addition to said acidic reacting agent.

7. A method as claimed in claim 5, in which said liquid B contains one or more materials selected from the group consisting of acidic reacting agent, gel control agent and clay, in addition to said water glass.

8. A method as claimed in claim 7, in which, said liquid B is blended so that the pH value thereof is maintained with a range of from weak acidity to weak alkalinity, and during the injection of said liquids A and B, the feeding of said liquid A is suspended so that only said liquid B is injected in said soil.

9. A method as claimed in claim 5, in which at least one of said liquids A and B is injected under high pressure in the form of a jet stream.

10. In a method of solidifying a soil or making soil watertight by injecting a hardener thereinto, in which a mixture of water glass and acidic reacting agent is employed as said hardener, and said solution is blended so that the pH value thereof is within a range of from weak acidity to weak alkalinity, characterized in that a liquid A which is a water glass solution, and a liquid B which is a mixture of water glass and acidic reacting agent are employed as said hardener, said liquids A and B are joined together and are injected into said soil, each of said liquids A and B being blended so that the pH value of the liquid obtained by combining said liquids A and B is maintained within a range of from weak acidity of about 5 to weak alkalinity of about 9, thereby to reduce the pollution of soil or subterranean water.

11. A method as claimed in claim 10, in which said liquid A contains one or more materials selected from the group consisting of acidic reacting agent, gel control agent and clay, in addition to said water glass.

12. A method as claimed in claim 10, in which said liquid B contains one or two materials selected from the group consisting of gel control agent and clay, in addition to said water glass and said acidic reacting agent.

13. A method as claimed in claim 10, in which, said liquid B is blended so that the pH value thereof is maintained within a range of from weak acidity to weak alkalinity, and during the injection if said liquids A and B, the feeding of said liquid A is suspended so that only said liquid B is injected into said soil.

14. A method as claimed in claim 10, in which at least one of said liquids A and B is injected under high pressure in the form of a jet stream.

* * * * *